US006636784B1

(12) United States Patent
Tanner, Jr. et al.

(10) Patent No.: US 6,636,784 B1
(45) Date of Patent: Oct. 21, 2003

(54) ELECTRICITY TRANSFER STATION

(75) Inventors: Max H. Tanner, Jr., Dallas, TX (US);
Mike Warren, Dallas, TX (US);
Houston C. Ross, Garland, TX (US)

(73) Assignee: Energy Transfer Group, L.L.C.,
Dallas, TX (US)

( * ) Notice: Subject to any disclaimer, the term of this patent is extended or adjusted under 35 U.S.C. 154(b) by 519 days.

(21) Appl. No.: 09/685,929

(22) Filed: Oct. 9, 2000

(51) Int. Cl.$^7$ ............................................... G05D 11/00
(52) U.S. Cl. ......................... 700/287; 700/22; 700/291
(58) Field of Search ......................... 700/22, 286, 287, 700/291, 295; 323/212

(56) References Cited

U.S. PATENT DOCUMENTS

| | | | |
|---|---|---|---|
| 3,702,460 A | * 11/1972 | Blose | 340/150 |
| 3,975,673 A | 8/1976 | Boshnyaga et al. | 323/119 |
| 4,013,942 A | 3/1977 | Boshnyaga et al. | 323/119 |
| 4,156,174 A | 5/1979 | Specht | 323/43.5 |
| 4,198,595 A | 4/1980 | Milkovic | 323/6 |
| 4,621,198 A | 11/1986 | Roberge et al. | 307/82 |
| 5,166,597 A | 11/1992 | Larsen et al. | 323/215 |
| 5,371,485 A | 12/1994 | Manimalethu | 336/180 |
| 5,461,300 A | 10/1995 | Kappenman | 323/215 |
| 5,528,507 A | * 6/1996 | McNamara et al. | 364/483 |
| 5,619,119 A | 4/1997 | Pelletier et al. | 323/215 |
| 5,907,239 A | 5/1999 | Pelletier et al. | 323/361 |
| 6,005,759 A | * 12/1999 | Hart et al. | 361/66 |

OTHER PUBLICATIONS

"Application of Large Phase–Shifting Transformer on an Interconnect System Loop," Lyman, W.J., North, J.R.; Transactions, Oct. 1938, vol. 57, pp 579–588.

* cited by examiner

Primary Examiner—Paul P. Gordon
(74) Attorney, Agent, or Firm—Daniel J. Chalker; Chalker Flores, LLP (57) ABSTRACT

The present invention provides a system and method for an electricity transfer station. The present invention provides a method for providing a first electricity flow at a first network connection by monitoring a second electricity flow from a second network connection to one or more third network connections and one or more electricity transfer devices. The present invention then controls the one or more electricity transfer devices and one or more electricity sources so that the second electricity flow is less than or equal to a first value and the first electricity flow is provided at the first network connection. In addition, the present invention provides a system for providing a first electricity flow at a first network connection using a second electricity flow at a second network connection. The system includes one or more electricity transfer devices connected between the first network connection and the second network connection, one or more electricity sources connected to the first network connection, and an electricity transfer controller connected to the one or more electricity transfer devices, the one or more electricity sources, the first network connection and the second network connection. The electricity transfer controller monitors the first electricity flow and the second electricity flow, and controls the one or more electricity transfer devices and the one or more electricity sources so that the second electricity flow is less than or equal to a first value and the first electricity flow is provided at the first network connection.

67 Claims, 6 Drawing Sheets

ELECTRICITY TRANSFER STATION

FIELD OF THE INVENTION

The present invention relates generally to the field of alternating current ("AC") network interconnections, electricity generation and usage, and more particularly, to an electricity transfer station.

BACKGROUND OF THE INVENTION

Electricity suppliers have traditionally sold electricity to large customers, such as large commercial and industrial customers, rural electric cooperatives and municipalities, based on a demand charge and the customer's actual electricity usage. The demand charge is based on the customer's expected or actual peak demand (normally measured in kilowatts ("KW")) over a short period of time (normally 15 to 30 minutes) during a contractual billing period. The customer's peak demand and electricity usage (normally measured in kilowatt-hours ("KWH")) charges are typically specified in long term contracts. As a result, the customer pays a periodic fee, usually monthly, for the ability to draw its peak demand from the electricity supplier via a transmission network even though that peak demand may only occur once during the contractual billing period, if at all. Moreover, if the customer's actual demand exceeds the contractual demand, significant excess demand charges and/or penalties may be imposed on the customer.

Some customers, such as rural electric cooperatives and municipalities, have negotiated long term, low cost electricity purchase contracts with their electricity suppliers. As the re-delivery market for electricity has developed over the years through deregulation and diversification, some of these customers and third-party electricity suppliers have seen an opportunity to purchase additional electricity under existing electricity purchase contracts and re-deliver that additional electricity to other customers at a profit. The sale of such additional electricity is, however, limited and reduced in value if it cannot be sold on a firm basis. For example, the customer may limit the amount of electricity that can be re-delivered based on the economics of the electricity purchase contract. Furthermore, the additional electricity may be reduced in value because it is sold under an interruptible contract, which means that the availability of the additional electricity is not guaranteed during peak demand periods. In order to provide non-interruptible electricity, the customer or third-party electricity supplier would risk setting a new peak demand for the customer, which may be financially unacceptable.

Accordingly, there is a need for an electricity transfer station that can provide an un-interruptible electricity supply for re-delivery to other electricity customers.

SUMMARY OF THE INVENTION

The present invention provides an electricity transfer station and a method of operating the electricity transfer station that allows electricity to be secured by a customer of an electricity supplier via a transmission network under an existing electricity supply contract and re-delivered by that customer to another party under a non-interruptible supply contract without risk of increasing the customer's peak demand above a desired value. This system and method affords the customer more flexibility, and thus more opportunity to extract value from its supply contracts as well as its distribution, transmission and generation equipment.

More specifically, the present invention provides a method for providing a first electricity flow at a first network connection by monitoring a second electricity flow from a second network connection to one or more third network connections and one or more electricity transfer devices. The present invention then controls the one or more electricity transfer devices and one or more electricity sources so that the second electricity flow is less than or equal to a first value and the first electricity flow is provided at the first network connection.

The present invention also provides a method for providing a first electricity flow at an electricity re-delivery point by monitoring a second electricity flow at an electricity delivery point, monitoring the first electricity flow at the electricity re-delivery point, and monitoring an electricity transfer at one or more electricity transfer devices. The present invention then controls the one or more electricity transfer devices connected between the electricity delivery point and the electricity re-delivery point so that the second electricity flow is less than or substantially equal to a first value and the first electricity flow is substantially equal to a second value. In addition, the present invention controls one or more electricity sources connected to the electricity re-delivery point so that when the electricity transfer is substantially equal to the second value, the one or more electricity sources do not operate, and when the electricity transfer is less than the second value, the one or more electricity sources provide sufficient electricity flow such that the first electricity flow is substantially equal to the second value.

In addition, the present invention provides a system for providing a first electricity flow at a first network connection using a second electricity flow at a second network connection. The system includes one or more electricity transfer devices connected between the first network connection and the second network connection, one or more electricity sources connected to the first network connection, and an electricity transfer controller connected to the one or more electricity transfer devices, the one or more electricity sources, the first network connection and the second network connection. The electricity transfer controller monitors the first electricity flow and the second electricity flow, and controls the one or more electricity transfer devices and the one or more electricity sources so that the second electricity flow is less than or equal to a first value and the first electricity flow is provided at the first network connection.

Other features and advantages of the present invention shall be apparent to those of ordinary skill in the art upon reference to the following detailed description taken in conjunction with the accompanying drawings.

BRIEF DESCRIPTION OF THE DRAWINGS

The above and further advantages of the invention may be better understood by referring to the following description in conjunction with the accompanying drawings in which corresponding numerals in the different figures refer to corresponding parts in which.

DETAILED DESCRIPTION

While the making and using of various embodiments of the present invention are discussed herein in terms of an electricity customer having an electricity purchase contract with an electricity supplier, it should be appreciated that the present invention provides many applicable inventive concepts which can be embodied in a wide variety of specific contexts. In fact, the present invention can be used in any situation where a non-interruptible amount of electricity is to be re-delivered from an electricity delivery point that has capacity limitations, whether those limitations are contractual or physical. The specific embodiments discussed herein are merely illustrative of specific ways to make and use the invention and does not limit the scope of the invention.

More specifically, the present invention provides an electricity transfer station and a method of operating the electricity transfer station that allows electricity to be secured by a customer of an electricity supplier via a transmission network under an existing electricity supply contract and re-delivered by that customer to another party under a non-interruptible supply contract without risk of increasing the customer's peak demand above a desired value. This system and method affords the customer more flexibility, and thus more opportunity to extract value from its supply contracts as well as its distribution, transmission and generation equipment.

Figure 1:
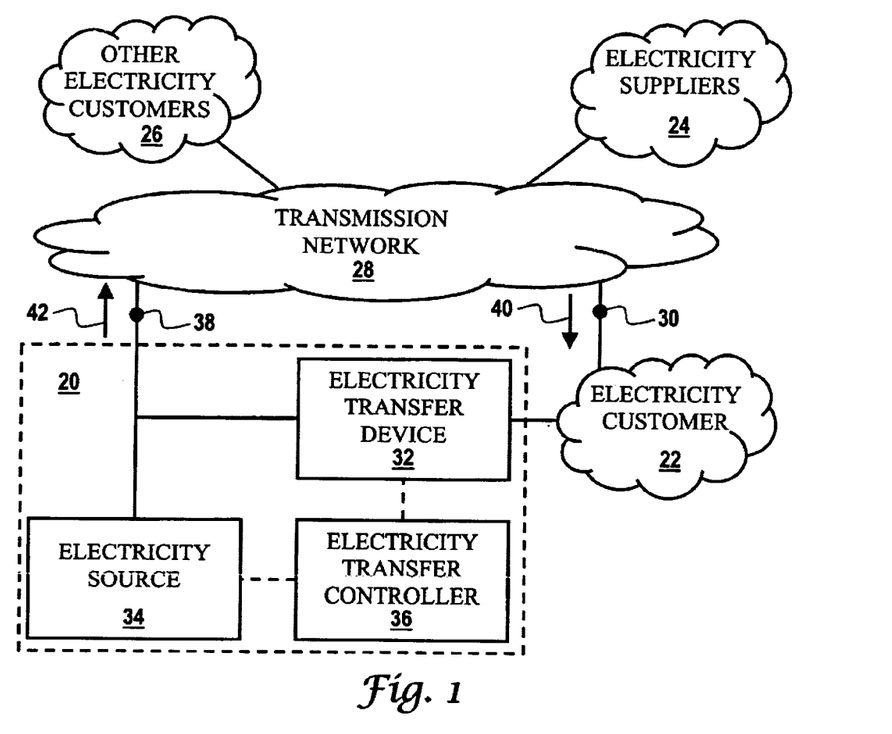
FIG. 1 is a block diagram showing an electricity transfer station connected to an electricity customer, and an electricity supplier and other electricity customers via a transmission network.

Referring now to FIG. 1, a block diagram showing an electricity transfer station 20 connected to an electricity customer 22, and to one or more electricity suppliers 24 and other electricity customers 26 via a transmission network 28 is shown. The electricity customer 22, which may be a large commercial or industrial customer, rural electric cooperative or municipality, purchases electricity from an electricity supplier(s) 24 via the transmission network 28 at an electricity delivery point 30, also referred to as a second network connection. The electricity delivery point 30 can be at nominal transmission voltages, such as 69 kilovolts ("KV"), 138 KV, 230 KV or 345 KV, or at nominal distribution voltages, such as 15 KV or 25 KV. Although these voltages are commonly used, the present invention can be designed to operate at any desired voltage. Note also that the electricity customer's metering point may not be at the same point as the electricity delivery point 30. For example, the delivery voltages may be at 138 KV, but the metering point may be at 25 KV because the metering equipment is less complex and expensive. Adjustments are then made to convert the metering data to an 138 KV equivalent.

The electricity delivery point 30 will typically be located in or near a substation. The ownership of the equipment in the substation will depend on the contractual agreement between the owner of the transmission network 28, the electricity supplier(s) 24 and the electricity customer 22. Typically, the substation will contain circuit breakers, step-down transformers, metering equipment, distribution circuit breakers/reclosers, switches and various protective and metering devices. The electricity transfer station 20 of the present invention is typically installed within or next to the electricity customer's substation. Accordingly, the capacity of the electricity transfer station 20 is affected by the ratings of the equipment within the substation and by any restrictions imposed by the electricity customer 22, including but not limited to a maximum electricity flow at the electricity delivery point 30.

The electricity transfer station 20 includes one or more electricity transfer devices 32, one or more electricity sources 34 and an electricity transfer controller 36. The electricity transfer station 20 is connected to the transmission network 28 or some other transmission network at the electricity re-delivery point 38, also referred to as a first network connection. As indicated by arrow 40, also referred to as a second electricity flow, electricity flows from the transmission network 28 through electricity delivery point 30 to the electricity customer 22 and the electricity transfer station 20. As indicated by arrow 42, also referred to as a first electricity flow, electricity flows from the electricity transfer station 20 through electricity re-delivery point 38 to the transmission network 28.

The one or more electricity transfer devices 32 may be a phase-shifting transformer, a static transfer device (AC to direct current ("DC") to AC conversion system), a motor-generator package (AC to DC converter, DC motor and AC generator) or other suitable devices that can regulate the electricity flow through the electricity transfer device 32. The one or more electricity sources 34 may be combustion turbine generators, steam turbine generators, batteries, fuel cells, solar cells, wind generators, biomass generators, hydroelectric generators or other type of electricity source. The one or more electricity sources 34 generate reliable electricity during peak demand periods and are economical to purchase, lease, operate and/or maintain.

Figure 2:
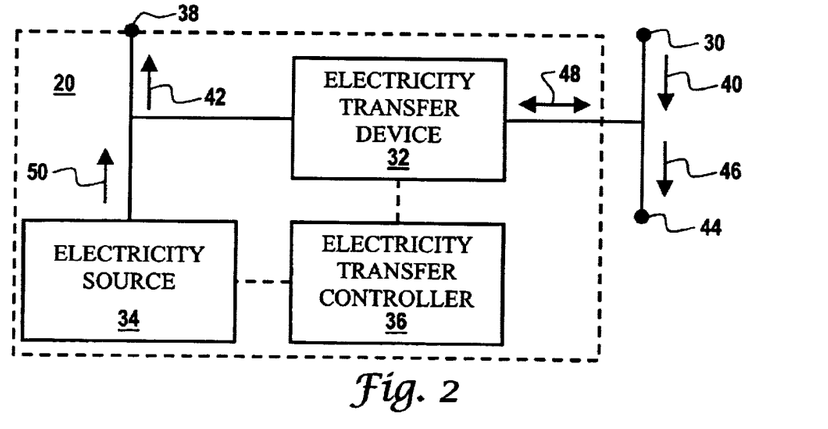
FIG. 2 is a block diagram showing electricity flow in and out of an electricity transfer station in accordance with the present invention.

Now referring to FIG. 2, a block diagram showing electricity flow in and out of an electricity transfer station 20 in accordance with the present invention is shown. As described in FIG. 1 and indicated by arrow 40, electricity flows from the electricity delivery point 30 to primarily serve one or more customer network connections 44, also referred to as a third network connection. Accordingly, the electricity.customer's load is connected to the one or more customer network connections 44. The electricity flow to the electricity customer 22 (FIG. 1) is represented by arrow 46.

When second electricity flow 40 is less than an a first value, the one or more electricity transfer devices 32 will cause a electricity to flow into the electricity transfer station 20, as indicated by arrow 48 and referred to as a third electricity flow. The first value is a maximum electricity flow determined by the electricity customer 22 (FIG. 1), which may be based on the contractual and/or physical limitations of the electricity customer's substation. The first value may also be the electrical customer's contractual peak demand or other peak demand limit set by the electricity transfer station 20. The amount of electricity transfer 48 is controlled by the electricity transfer controller 36 so that the first electricity flow 42 back into the transmission network 28 (FIG. 1) through electricity re-delivery point 38 is the desired amount without having the second electricity flow 40 exceed the first value. Whenever electricity transfer 48 is insufficient to meet the desired amount for first electricity flow 42, the electricity transfer controller 36 will activate and control the one or more electricity sources 34 to supply the deficiency as indicated by arrow 50. As a result, the one or more electricity sources 34 are used to provide additional electricity during the customer's peak demand periods when the second electricity flow 40 and the third electricity flow 48 (electricity transfer) cannot be increased to supply the desired amount of first electricity flow 42.

Note that the one or more electricity sources 34 could be used to provide electricity back through the one or more electricity transfer devices 32 or a bypass around the one or more electricity transfer devices 32 to the electricity customer 22 (FIG. 1). In such a case, the third electricity flow 48 would be in the opposite direction and flow into the one or more third network connections 44. Thus, the one or more electricity sources 34 could supply electricity to the electricity customer 22 (FIG. 1) during emergency or peak conditions.

Figure 3:
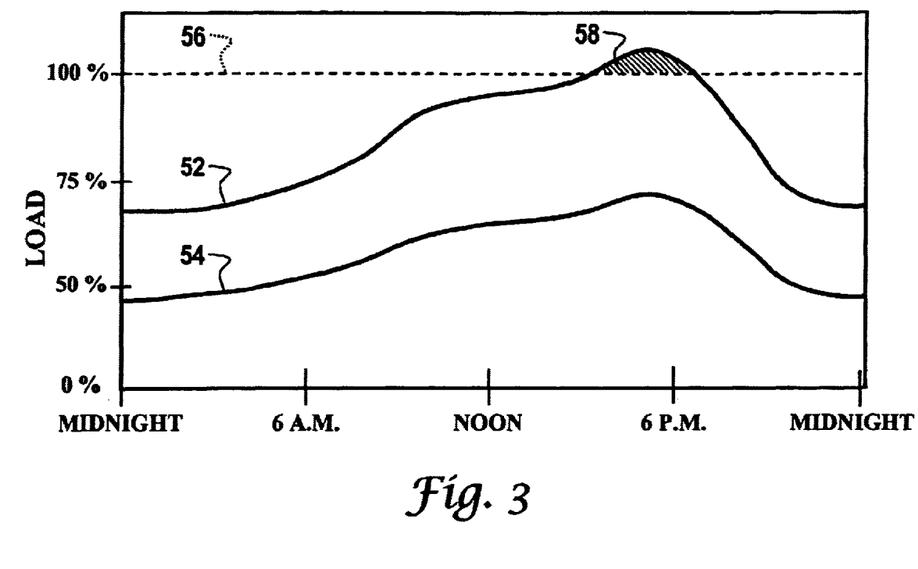
FIG. 3 is a graph showing peak and off-peak demand curves for an electricity customer.

FIG. 3 is a graph showing peak and off-peak demand curves 52 and 54, respectively, for electricity customer 22 (FIG. 1). The peak demand curve 52 and off-peak demand curve 54 correspond to different electricity flows (daily and/or seasonal) to the electricity customer 22 (FIG. 1) represented by arrow 46 (FIG. 2). Much of the time, the customer's off-peak demand curve 54 is well below the contractual peak demand 56. As a result, the difference between lines 54 and 5.6 represents the available electricity that can be re-delivered without setting a new peak demand for the electricity customer 22 (FIG. 1). As previously mentioned, setting a new peak demand or exceeding the contractual peak demand. 56 may be financially undesirable. For example, the electricity customer 22 (FIG. 1) may have to pay significant excess demand charges and fees if the peak demand curve 52 exceeds the contractual peak demand 56 as indicated by shaded area 58. In such a case, the contractual peak demand 56 is equivalent to the first value described above. But, the contractual peak demand 56 may be any maximum electricity flow determined by the electricity customer 22 (FIG. 1) or other peak demand limit set by the electricity transfer station 20.

As shown during peak demand periods, there is less available electricity that can be re-delivered, the difference between lines 52 and 56, without setting a new peak demand for the electricity customer 22 (FIG. 1). As a result, any re-delivered electricity must be sold as interruptible electricity, meaning that delivery of the re-delivery electricity cannot be guaranteed and that the electricity will probably not be available during peak demand periods in which it is most often needed. Interruptible electricity is typically sold at a discount as compared to non-interruptible or firm electricity.

Figure 4:
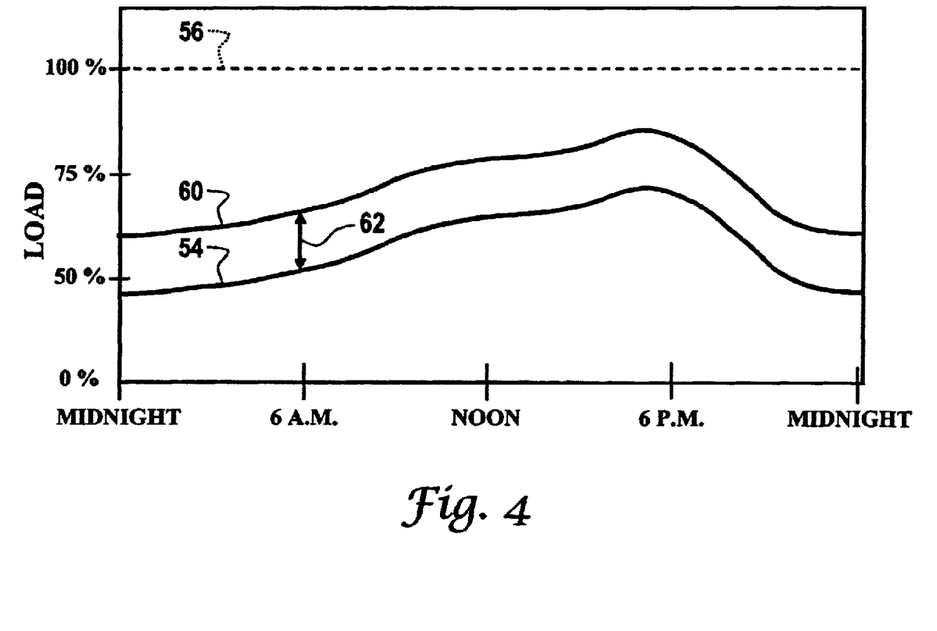
FIG. 4 is a graph showing a customer off-peak demand curve and a total demand curve in accordance with the present invention.

Referring now to FIG. 4, a graph showing a customer off-peak demand curve 54 and a total demand curve 60 using the electricity transfer station 20 (FIGS. 1 and 2) in accordance with the present invention is shown. As mentioned in reference to FIG. 3, the electricity transfer station 20 (FIGS. 1 and 2) can transfer and re-deliver electricity, without having to generate any additional electricity, as long as the total demand curve 60 is less than the first value or contractual peak demand 56. Note that the off-peak demand curve 54 corresponds to arrow 46 (FIG. 2) and the total demand curve 60 corresponds to the second electricity flow 40 (FIGS. 1 and 2). The re-delivery demand 62, which is the difference between the total demand curve 60 and the off-peak demand curve 54, therefore, represents the first electricity flow 42 (FIGS. 1 and 2). So, as long as the re-delivery demand 62 or second value is not set too high, the electricity transfer station 20 (FIGS. 1 and 2) can operate much of the time without having to generate any additional electricity.

Figure 5:
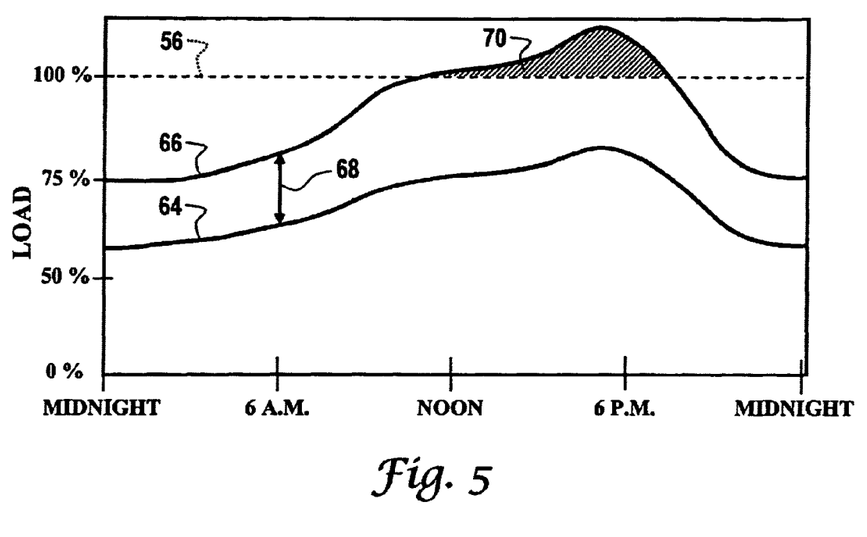
FIG. 5 is a graph showing a customer peak demand curve and a total demand curve without using the electricity transfer station in accordance with the present invention.

Now referring to FIG. 5, a graph showing a customer peak demand curve 64 and a total demand curve 66 without using the electricity transfer station 20 (FIGS. 1 and 2) in accordance with the present invention is shown. Note that the peak demand curve 64 corresponds to arrow 46 (FIG. 2) and the total demand curve 66 corresponds to the second electricity flow 40 (FIGS. 1 and 2). The re-delivery demand 68, which is the difference between the total demand curve 66 and the peak demand curve 64, therefore, represents the first electricity flow 42 (FIGS. 1 and 2). If the electricity transfer station 20 (FIGS. 1 and 2) of the present invention is not used, the total demand curve 66 or second electricity flow 40 (FIGS. 1 and 2) will exceed the second value or the electricity customer's contractual peak demand 56 during peak demand periods, as indicated by shaded area 70. Since the advantages of the electricity re-delivery would most likely be affected if the second value or target peak demand 56, which may or may not be the contractual peak demand, is exceeded, the first electricity flow 42 (FIGS. 1 and 2) must be provided as interruptible electricity. If, however, the electricity transfer station 20 (FIGS. 1 and 2) of the present invention is used, the first electricity flow 42 (FIGS. 1 and 2) can be provided as non-interruptible electricity.

Figure 6:
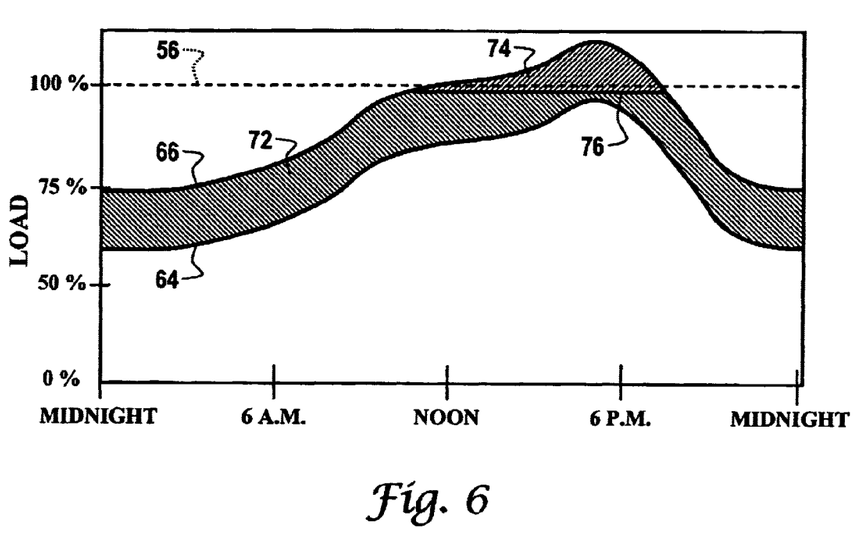
FIG. 6 is a graph showing a customer peak demand curve and a total demand curve using one or more electricity transfer devices and one or more electricity sources in accordance with the present invention.

For example, FIG. 6 is a graph showing a customer peak demand curve 64 and total demand curve 66 using one or more electricity transfer devices 32 (FIGS. 1 and 2) and one or more electricity sources 34 (FIGS. 1 and 2) in accordance with the present invention. As before, the peak demand curve 64 corresponds to arrow 46 (FIG. 2) and the total demand curve 66 corresponds to the second electricity flow 40 (FIGS. 1 and 2). The electricity supplied by the one or more electricity transfer devices 32 (FIGS. 1 and 2) is indicated by shaded area 72, which corresponds to electricity transfer 48 (FIG. 2). The electricity supplied by the one or more electricity sources 34 (FIGS. 1 and 2) is indicated by shaded area 74, which corresponds to arrow 50 (FIG. 2). Thus, the combination of shaded areas 72 and 74 corresponds to the first electricity flow 42, which can be provided as non-interruptible electricity. Preferably, an appropriate safety factor indicated by the difference between lines 56 and 76, will be incorporated into the control of the one or more electricity transfer devices 32 (FIGS. 1 and 2) and the one or more electricity sources 34 (FIGS. 1 and 2) so that the contractual peak demand 56 or first value is not exceeded.

Figure 7:
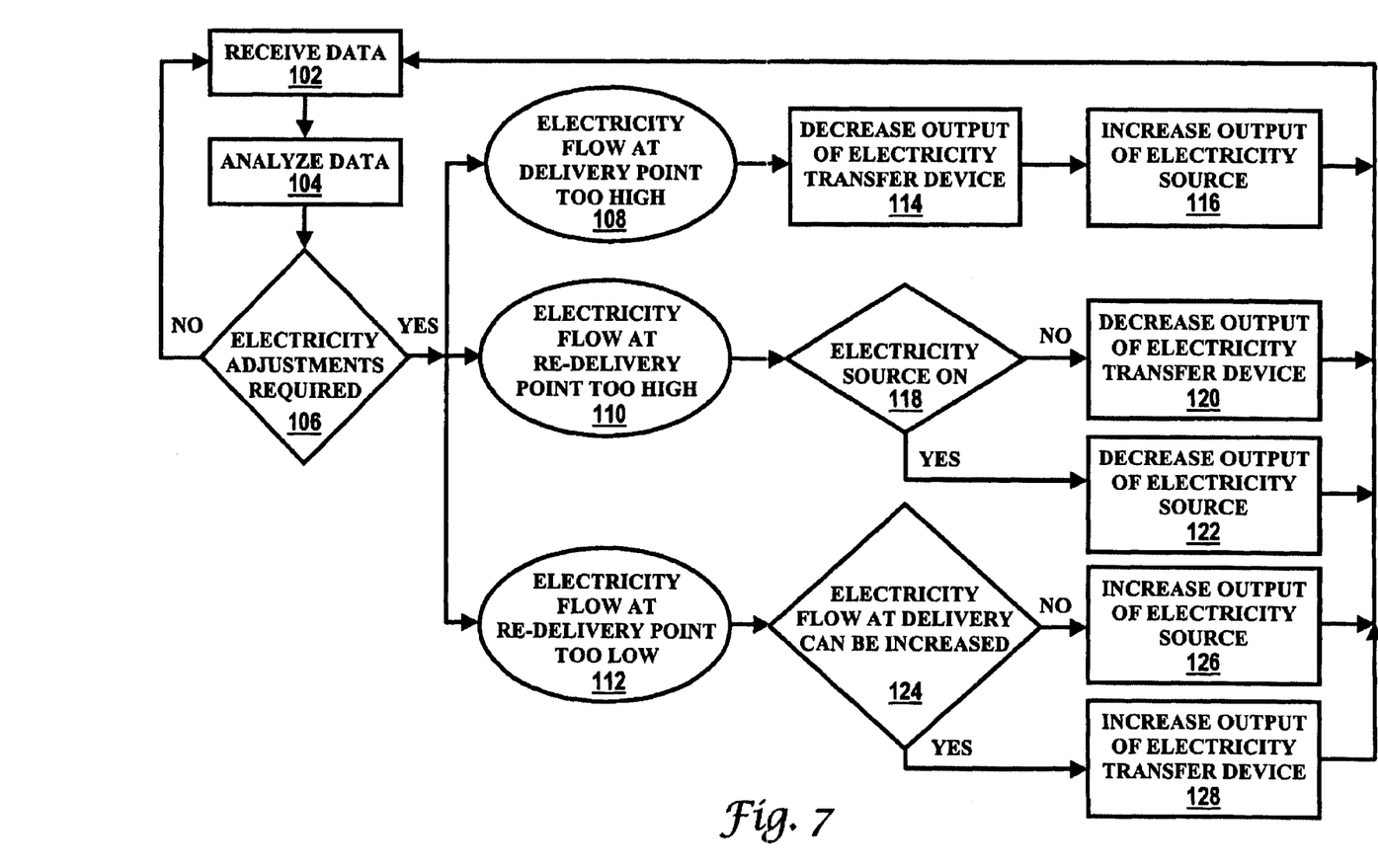
FIG. 7 is a flow chart for the electricity transfer controller in accordance with the present invention.

Referring now to FIG. 7, a flow chart for the electricity transfer controller 36 (FIGS. 1 and 2) in accordance with the present invention is shown. The electricity transfer controller 36 (FIGS. 1 and 2) receives operating data from the electricity delivery point 30 (FIGS. 1 and 2) and the electricity re-delivery point 38 (FIGS. 1 and 2). As recognized by a person skilled in the art, the electricity transfer controller 36 (FIGS. 1 and 2) will also receive data from other sources to monitor operating conditions, protective relaying, metering, check for fault or overload conditions, etc. Thereafter, the electricity transfer controller 36 (FIGS. 1 and 2) will analyze the operating data in block 104 and determine whether any electricity adjustments to the system need to be made in decision block 106. If no adjustments are necessary, the process loops back to block 102 where new operating data is received. Note that the electricity transfer controller 36 (FIGS. 1 and 2) can be programmed to provide a predefined, variable electricity flow at the electricity re-delivery point 38 (FIGS. 1 and 2).

If, however, electricity adjustments are required, as determined in decision block 106, the electricity transfer controller 36 (FIGS. 1 and 2) will make the appropriate adjustments as illustrated in ovals 108, 110 or 112. If the second electricity flow 40 (FIGS. 1 and 2) at the electricity delivery point 30 (FIGS. 1 and 2) is too high, as indicated by oval 108, the electricity transfer controller 36 (FIGS. 1 and 2) will decrease the electricity output of the one or more electricity transfer devices 32 (FIGS. 1 and 2) in block 114 and will increase the electricity output of the one or more electricity sources 34 (FIGS. 1 and 2) in block 116. Thereafter, the process loops back to block 102 where new operating data is received.

If the first electricity flow 42 (FIGS. 1 and 2) at the electricity re-delivery point 38 (FIGS. 1 and 2) is too high, as indicated by oval 110, the electricity transfer controller 36 (FIGS. 1 and 2) will determine whether the one or more electricity sources 34 (FIGS. 1 and 2) are on in decision block 118. If one or more electricity sources 34 (FIGS. 1 and 2) are not on, the electricity transfer controller 36 (FIGS. 1 and 2) will decrease the electricity output of the one or more electricity transfer devices 32 (FIGS. 1 and 2) in block 120. If, however, the one or more electricity sources 34 (FIGS. 1 and 2) are on, as determined in decision block 118, the electricity transfer controller 36 (FIGS. 1 and 2) will decrease the electricity output of the one or more electricity sources 34 (FIGS. 1 and 2) in block 122. Thereafter, the process loops back to block 102 where new operating data is received.

If the first electricity flow 42 (FIGS. 1 and 2) at the electricity re-delivery point 38 (FIGS. 1 and 2) is too low, as indicated by oval 112, the electricity transfer controller 36 (FIGS. 1 and 2) will determine whether the second electricity flow 40 (FIGS. 1 and 2) at the electricity delivery point 30 (FIGS. 1 and 2) can be increased in decision block 124. If the second electricity flow 40 (FIGS. 1 and 2) at the electricity delivery point 30 (FIGS. 1 and 2) cannot be increased, the electricity transfer controller 36 (FIGS. 1 and 2) will increase the electricity output of the one or more electricity sources 34 (FIGS. 1 and 2) in block 126. If, however, the second electricity flow 40 (FIGS. 1 and 2) at the electricity delivery point 30 (FIGS. 1 and 2) can be increased, as determined in decision block 124, the electricity transfer controller 36 (FIGS. 1 and 2) will increase the electricity output of the one or more electricity transfer devices 32 (FIGS. 1 and 2) in block 128. Thereafter, the process loops back to block 102 where new operating data is received.

Figure 8:
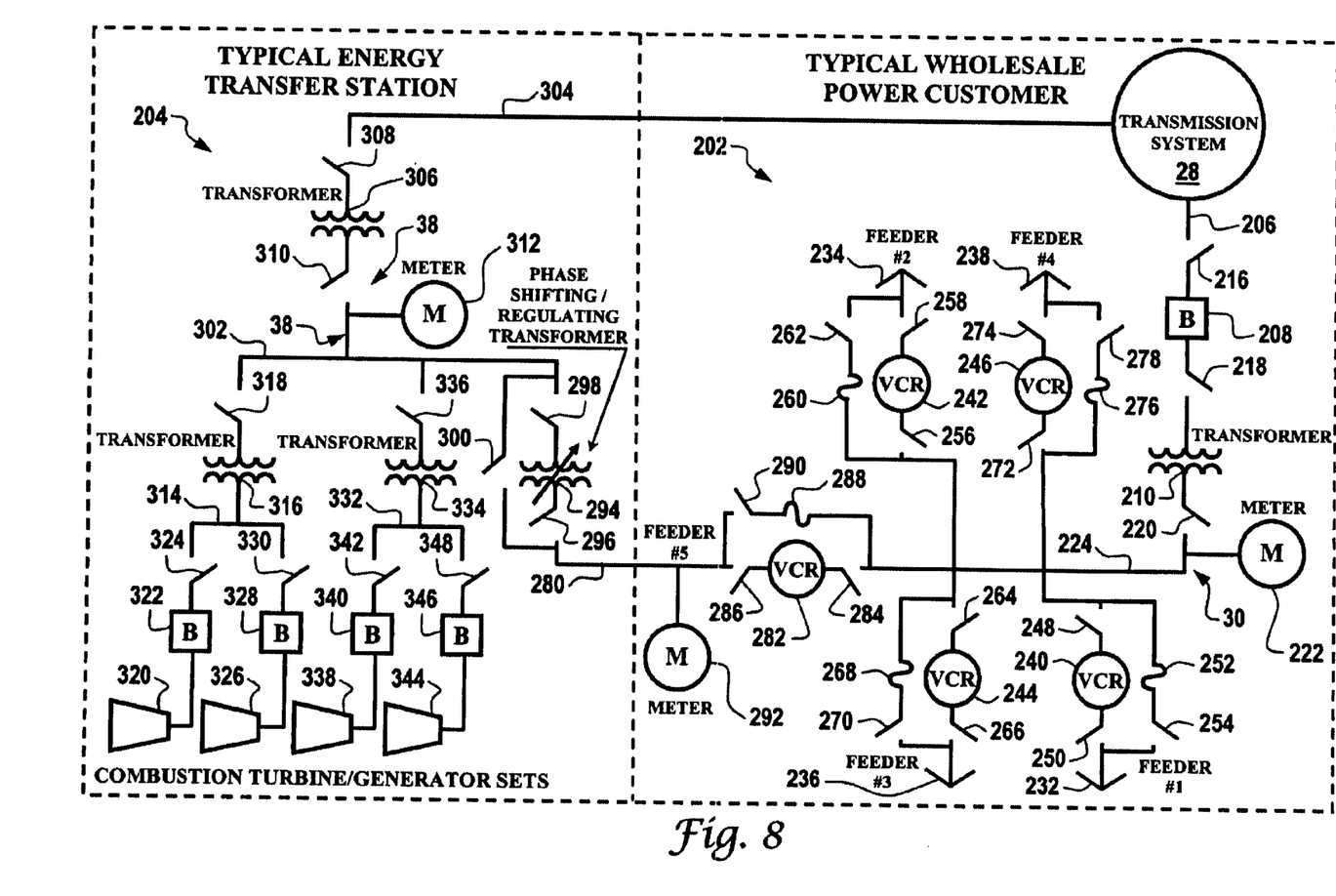
FIG. 8 is a one-line diagram of one possible implementation of the electricity transfer station in accordance with the present invention.

Now referring to FIG. 8, a one-line diagram of one possible implementation of the present invention is shown. A wholesale power customer substation 202 is connected to a transmission system 38 via transmission line 206. A step-down transformer 210 is connected to the transmission line 206 via breaker 208. The breaker 208 can be isolated with switches 216 and 218; whereas the step-down transformer 210 can be isolated with switches 218 and 220. A meter 222 at the electricity delivery point 30 or the second network connection records the second energy flow from the step-down transformer 210. Meter 222 is connected between the step-down transformer 210 and the substation distribution bus 224.

Four distribution feeders 232, 234, 236 and 238 are connected to the substation distribution bus 224 via circuit reclosers 240, 242, 244 and 246 respectively. Thus electricity is distributed to the wholesale customer's system via distribution feeders 232, 234, 236 and 238. Distribution feeders 232, 234, 236 and 238 represents the one or more third network connections 44 (FIG. 2). Circuit recloser 240 can be isolated with switches 248 and 250, and bypassed with fuse 252 and switch 254. Circuit recloser 242 can be isolated with switches 256 and 258, and bypassed with fuse 260 and switch 262. Circuit recloser 244 can be isolated with switches 264 and 266, and bypassed with fuse 268 and switch 270. Circuit recloser 246 can be isolated with switches 272 and 274, and bypassed with fuse 276 and switch 278.

The electricity transfer station 204 is connected to the wholesale power customer's substation 202 via a distribution bus or line 280. More specifically, the distribution bus or line 280 is connected to the substation distribution bus 224 via circuit recloser 282. Circuit recloser 282 can be isolated with switches 284 and 286, and bypassed with fuse 288 and switch 290. The electricity flow through the distribution bus or line 280 is measured by meter 292. A phase shifting/regulating transformer 294 is connected between the distribution bus or line 280 and transfer bus 302. Phase shifting/regulating transformer 294 or some other electricity transfer devices, causes electricity to flow through distribution bus or line 280. Phase shifting/regulating transformer 294 can be isolated with switches 296 and 298 or bypassed with switch 300.

The electricity transfer station 204 is also connected to the transmission system 28 via transmission line 304. Step-up transformer 306 is connected between transmission line 304 and transfer bus 302. Step-up transformer 306 can be isolated with switches 308 and 310. A meter 312 is connected between the step-up transformer 306 and the transfer bus 302, which corresponds to the electricity re-delivery point 38 or first network connection.

A first generation bus 314 is connected to transfer bus 302 via step-up transformer 316 and a switch 318. A first generator 320 is connected to the first generation bus 314 via breaker 322 and switch 324. A second generator 326 is connected to the first generation bus 314 via breaker 328 and switch 330. Similarly, a second generation bus 332 is connected to transfer bus 302 via step-up transformer 334 and a switch 336. A third generator 338 is connected to the second generation bus 332 via breaker 340 and switch 342. A fourth generator 344 is connected to the second generation bus 332 via breaker 346 and switch 348.

Figure 9:
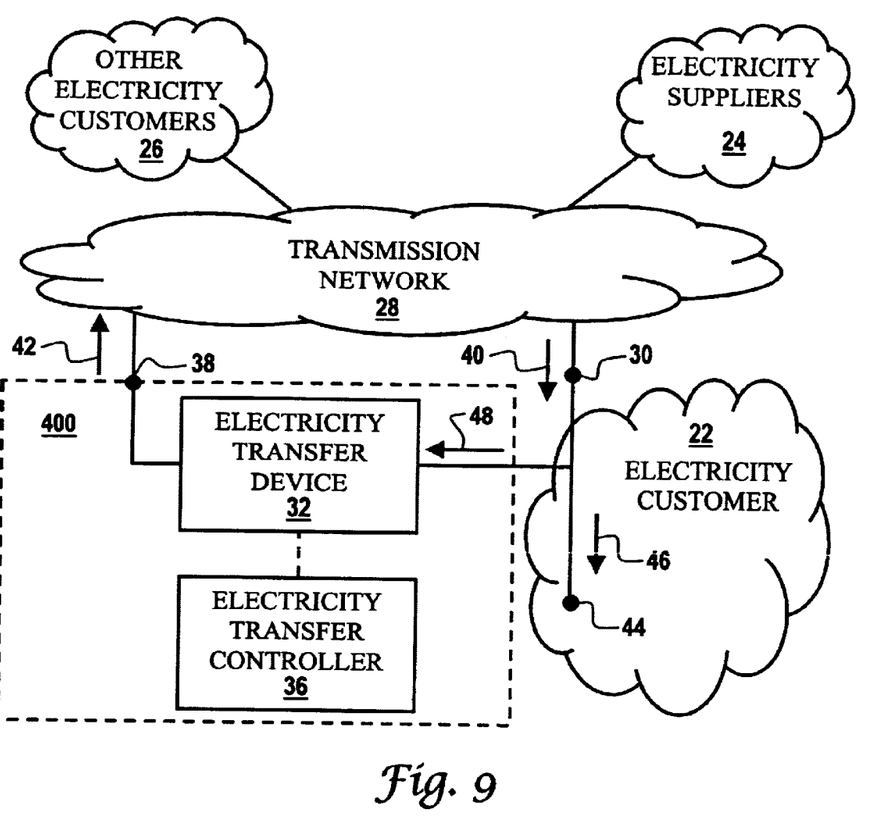
FIG. 9 is a block diagram showing electricity flow in and out of an electricity transfer station in accordance with another embodiment of the present invention.

Now referring to FIG. 9, a block diagram showing electricity flow in and out of an electricity transfer station 400 in accordance with another embodiment of the present invention is shown. As in FIG. 1, the electricity transfer station 400 is connected to an electricity customer 22, and to one or more electricity suppliers 24 and other electricity customers 26 via a transmission network 28. The electricity customer 22, which may be a large commercial or industrial customer, rural electric cooperative or municipality, purchases electricity from an electricity supplier(s) 24 via the smission network 28 at an electricity delivery point 30, also referred to as a second network connection. The electricity delivery point 30 can be at nominal transmission voltages, such as 69 kilovolts ("KV"), 138 KV, 230 KV or 345 KV, or at a distribution voltage, such as 15 KV or 25 KV. Although these voltages are commonly used, the present invention can be designed to operate at any desired voltage. Note also that the electricity customer's metering point may not be at the same point as the electricity delivery point 30. For example, the delivery voltage may be at 138 KV, but the metering point may be at 25 KV because the metering equipment is less complex and expensive. Adjustments are then made to convert the metering data to an 138 KV equivalent.

The electricity delivery point 30 will typically be located in or near a substation. The ownership of the equipment in the substation will depend on the contractual agreement between the owner of the transmission network 28, the electricity supplier(s) 24 and the electricity customer 22. Typically, the substation will contain circuit breakers, step-down transformers, metering equipment, distribution circuit breakers/reclosers, switches and various protective and metering devices. The electricity transfer station 400 of the present invention is typically installed within or next to the electricity customer's substation. Accordingly, the capacity of the electricity transfer station 400 is affected by the ratings of the equipment within the substation and by any restrictions imposed by the electricity customer 22, including but not limited to a maximum electricity flow at the electricity delivery point 30.

The electricity transfer station 400 includes one or more electricity transfer devices 32 and an electricity transfer controller 36. The electricity transfer station 400 is connected to the transmission network 28 or some other transmission network at the electricity re-delivery point 38, also referred to as a first network connection. As indicated by arrow 40, also referred to as a second electricity flow, electricity flows from the transmission network 28 through electricity delivery point 30 to the electricity customer 22 and the electricity transfer station 400. As indicated by arrow 42, also referred to as a first electricity flow, electricity flows from the electricity transfer station 400 through electricity re-delivery point 38 to the transmission network 28.

The one or more electricity transfer devices 32 may be a phase-shifting transformer, a static transfer device (AC to direct current ("DC") to AC conversion system), a motor-generator package (AC to DC converter, DC motor and AC generator) or other suitable devices that can regulate the electricity flow through the electricity transfer device 32.

As indicated by arrow 40, electricity flows from the electricity delivery point 30 to primarily serve one or more customer network connections 44, also referred to as a third network connection. Accordingly, the electricity customer's load is connected to the one or more customer network connections 44. The electricity flow to the electricity customer 22 is represented by arrow 46.

When second electricity flow 40 is less than an a first value, the one or more electricity transfer devices 32 will cause a electricity to flow into the electricity transfer station 400, as indicated by arrow 48 and referred to as a third electricity flow. The first value is a maximum electricity flow determined by the electricity customer 22, which may be based on the contractual and/or physical limitations of the electricity customer's substation. The first value may also be the electrical customer's contractual peak demand or other peak demand limit set by the electricity transfer station 400. The amount of electricity transfer 48 is controlled by the electricity transfer controller 36 so that the first electricity flow 42 back into the transmission network 28 through electricity re-delivery point 38 is the desired amount without having the second electricity flow 40 exceed the first value.

While specific alternatives to steps of the invention have been described herein, additional alternatives not specifically disclosed but known in the art are intended to fall within the scope of the invention. Thus, it is understood that other applications of the present invention will be apparent to those skilled in the art upon the reading of the described embodiment and a consideration of the appended claims and drawings.

What is claimed is:

1. A method for providing a first electricity flow at a first network connection comprising the steps of:
   monitoring a second electricity flow from a second network connection to one or more third network connections and one or more electricity transfer devices; and
   controlling the one or more electricity transfer devices and one or more electricity sources so that the second electricity flow is less than or equal to a first value and the first electricity flow is provided at the first network connection.

2. The method as recited in claim 1, further comprising the step of monitoring the first electricity flow from the one or more electricity transfer devices and the one or more electricity sources to the first network connection.

3. The method as recited in claim 1, further comprising step of monitoring a third electricity flow into the one or more electricity transfer devices from the second network connection.

4. The method as recited in claim 1, further comprising step of monitoring a third electricity flow from the one or more electricity sources to the one or more third network connections.

5. The method as recited in claim 1, further comprising step of preventing any electricity flow from the one or more electricity transfer devices to the second network connection.

6. The method as recited in claim 1, further comprising step of preventing any electricity flow from the one or more electricity transfer devices to the one or more third network connections.

7. The method as recited in claim 1, further comprising step of preventing any electricity flow from the first network connection to the one or more electricity transfer devices or the one or more electricity sources.

8. The method as recited in claim 1, wherein the first electricity flow is substantially equal to a second value.

9. The method as recited in claim 1, wherein the first value is a target demand.

10. The method as recited in claim 1, wherein the first value is a maximum demand determined by an electricity customer.

11. The method as recited in claim 1, wherein the one or more electricity transfer devices includes one or more phase-shifting transformers.

12. The method as recited in claim 1, wherein the one or more electricity transfer devices includes one or more static transfer devices.

13. The method as recited in claim 1, wherein the one or more electricity transfer devices includes one or more motor-generator packages.

14. The method as recited in claim 1, wherein the one or more electricity sources includes one or more combustion turbine generators.

15. The method as recited in claim 1, wherein the one or more electricity sources includes one or more steam turbine generators.

16. The method as recited in claim 1, wherein the one or more electricity sources includes one or more batteries.

17. The method as recited in claim 1, wherein the one or more electricity sources includes one or more fuel cells.

18. The method as recited in claim 1, wherein the one or more electricity sources includes one or more solar cells.

19. The method as recited in claim 1, wherein the one or more electricity sources includes one or more wind generators.

20. The method as recited in claim 1, wherein the one or more electricity sources includes one or more biomass generators.

21. The method as recited in claim 1, wherein the one or more electricity sources includes one or more hydroelectric generators.

22. The method as recited in claim 1, wherein the first network connection and the second network connection are equivalent metering points connected to an electricity transmission network.

23. The method as recited in claim 1, wherein the one or more third network connections are electricity distribution feeders.

24. A method for providing a first electricity flow at an electricity re-delivery point comprising the steps of:
monitoring a second electricity flow at an electricity delivery point;
monitoring the first electricity flow at the electricity re-delivery point;
monitoring an electricity transfer at one or more electricity transfer devices;
controlling the one or more electricity transfer devices connected between the electricity delivery point and the electricity re-delivery point so that the second electricity flow is less than or substantially equal to a first value and the first electricity flow is substantially equal to a second value;
controlling one or more electricity sources connected to the electricity re-delivery point so that when the electricity transfer is substantially equal to the second value, the one or more electricity sources do not operate, and when the electricity transfer is less than the second value, the one or more electricity sources provide sufficient electricity flow such that the first electricity flow is substantially equal to the second value.

25. The method as recited in claim 24, wherein the one or more electricity transfer devices includes one or more phase-shifting transformers.

26. The method as recited in claim 24, wherein the one or more electricity transfer devices includes one or more static transfer devices.

27. The method as recited in claim 24, wherein the one or more electricity transfer devices includes one or more motor-generator packages.

28. The method as recited in claim 24, wherein the one or more electricity sources includes one or more combustion turbine generators.

29. The method as recited in claim 24, wherein the one or more electricity sources includes one or more steam turbine generators.

30. The method as recited in claim 24, wherein the one or more electricity sources includes one or more batteries.

31. The method as recited in claim 24, wherein the one or more electricity sources includes one or more fuel cells.

32. The method as recited in claim 24, wherein the one or more electricity sources includes one or more solar cells.

33. The method as recited in claim 24, wherein the one or more electricity sources includes one or more wind generators.

34. The method as recited in claim 24, wherein the one or more electricity sources includes one or more biomass generators.

35. The method as recited in claim 24, wherein the one or more electricity sources includes one or more hydroelectric generators.

36. A system for providing a first electricity flow at a first network connection using a second electricity flow at a second network connection, the system comprising:
one or more electricity transfer devices connected between the first network connection and the second network connection;
one or more electricity sources connected to the first network connection;
an electricity transfer controller connected to the one or more electricity transfer devices, the one or more electricity sources, the first network connection and the second network connection, the electricity transfer controller monitoring the first electricity flow and the second electricity flow, and controlling the one or more electricity transfer devices and the one or more electricity sources so that the second electricity flow is less than or equal to a first value and the first electricity flow is provided at the first network connection.

37. The system as recited in claim 36, wherein the electricity transfer controller prevents any electricity flow from the one or more electricity transfer devices to the second network connection.

38. The system as recited in claim 36, wherein the electricity transfer controller prevents any electricity flow from the first network connection to the one or more electricity transfer devices or the one or more electricity sources.

39. The system as recited in claim 36, wherein the first electricity flow is substantially equal to a second value.

40. The system as recited in claim 36, wherein the first value is a target demand.

41. The system as recited in claim 36, wherein the first value is a maximum demand determined by a electricity customer.

42. The system as recited in claim 36, wherein the one or more electricity transfer devices includes one or more phase-shifting transformers.

43. The system as recited in claim 36, wherein the one or more electricity transfer devices includes one or more static transfer devices.

44. The system as recited in claim 36, wherein the one or more electricity transfer devices includes one or more motor-generator packages.

45. The system as recited in claim 36, wherein the one or more electricity sources includes one or more combustion turbine generators.

46. The system as recited in claim 36, wherein the one or more electricity sources includes one or more steam turbine generators.

47. The system as recited in claim 36, wherein the one or more electricity sources includes one or more batteries.

48. The system as recited in claim 36, wherein the one or more electricity sources includes one or more fuel cells.

49. The system as recited in claim 36, wherein the one or more electricity sources includes one or more solar cells.

50. The system as recited in claim 36, wherein the one or more electricity sources includes one or more wind generators.

51. The system as recited in claim 36, wherein the one or more electricity sources includes one or more biomass generators.

52. The system as recited in claim 36, wherein the one or more electricity sources includes one or more hydroelectric generators.

53. The system as recited in claim 36, wherein the first network connection and the second network connection are equivalent metering points connected to an electricity transmission network.

54. A method for providing a first electricity flow at an electricity re-delivery point comprising the steps of:
monitoring a second electricity flow at an electricity delivery point;
monitoring the first electricity flow at the electricity re-delivery point;

monitoring an electricity transfer at one or more electricity transfer devices; and controlling the one or more electricity transfer devices connected between the electricity delivery point and the electricity re-delivery point so that the second electricity flow is less than or substantially equal to a first value and the first electricity flow is substantially equal to a second value.

55. The method as recited in claim 54, wherein the one or more electricity transfer devices includes one or more phase-shifting transformers.

56. The method as recited in claim 54, wherein the one or more electricity transfer devices includes one or more static transfer devices.

57. The method as recited in claim 54, wherein the one or more electricity transfer devices includes one or more motor-generator packages.

58. A system for providing a first electricity flow at a first network connection using a second electricity flow at a second network connection, the system comprising:

one or more electricity transfer devices connected between the first network connection and the second network connection;

an electricity transfer controller connected to the one or more electricity transfer devices, the first network connection and the second network connection, the electricity transfer controller monitoring the first electricity flow and the second electricity flow, and controlling the one or more electricity transfer devices so that the second electricity flow is less than or equal to a first value and the first electricity flow is provided at the first network connection.

59. The system as recited in claim 58, wherein the electricity transfer controller prevents any electricity flow from the one or more electricity transfer devices to the second network connection.

60. The system as recited in claim 58, wherein the electricity transfer controller prevents any electricity flow from the first network connection to the one or more electricity transfer devices.

61. The system as recited in claim 58, wherein the first electricity flow is substantially equal to a second value.

62. The system as recited in claim 58, wherein the first value is a target demand.

63. The system as recited in claim 58, wherein the first value is a maximum demand determined by a electricity customer.

64. The system as recited in claim 58, wherein the one or more electricity transfer devices includes one or more phase-shifting transformers.

65. The system as recited in claim 58 wherein the one or more electricity transfer devices includes one or more static transfer devices.

66. The system as recited in claim 58, wherein the one or more electricity transfer devices includes one or more motor-generator packages.

67. The system as recited in claim 58, wherein the first network connection and the second network connection are equivalent metering points connected to an electricity transmission network.

* * * * *